United States Patent
Toyohara

(10) Patent No.: US 7,120,368 B2
(45) Date of Patent: Oct. 10, 2006

(54) IMAGE FORMING APPARATUS USING TWO OR MORE TONERS FOR ORDINARY PAPER OR OHP SHEET

(75) Inventor: Yuichiro Toyohara, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 10/902,057

(22) Filed: Jul. 30, 2004

(65) Prior Publication Data
US 2005/0058465 A1  Mar. 17, 2005

(30) Foreign Application Priority Data
Jul. 31, 2003  (JP)  ............................. 2003-204662

(51) Int. Cl.
*G03G 15/01* (2006.01)
(52) U.S. Cl. ......................... 399/45; 399/82; 399/223
(58) Field of Classification Search ................. 399/45, 399/82, 53, 223, 227
See application file for complete search history.

(56) References Cited

U.S. PATENT DOCUMENTS

| | | | |
|---|---|---|---|
| 6,393,229 B1 | 5/2002 | Toyohara | 399/50 |
| 6,591,072 B1 | 7/2003 | Hashimoto et al. | 399/50 |
| 6,819,902 B1 * | 11/2004 | Toyohara et al. | 399/227 X |
| 6,996,358 B1 * | 2/2006 | Ayaki et al. | 399/223 |
| 2004/0091292 A1 * | 5/2004 | Itoh et al. | 399/299 |
| 2005/0036798 A1 * | 2/2005 | Mochizuki | 399/45 X |

FOREIGN PATENT DOCUMENTS

| | | |
|---|---|---|
| JP | 8-30146 | 2/1996 |
| JP | 2001-318499 | 11/2001 |
| JP | 2002-31949 | 1/2002 |
| JP | 2002-116594 | 4/2002 |
| JP | 2002-116632 | 4/2002 |
| JP | 2002-148893 | 5/2002 |

* cited by examiner

*Primary Examiner*—Sophia S. Chen
(74) *Attorney, Agent, or Firm*—Fitzpatrick, Cella, Harper & Scinto

(57) ABSTRACT

An image forming apparatus includes an image bearing member; an electrostatic image forming device for forming an electrostatic image on the image bearing member on the basis of an input signal; a developing device for developing the electrostatic image with toners having the same hue and having different densities; a toner image formation device for forming a toner image on a recording material; and a fixing device for fixing the toner image on the recording material, wherein a total of amounts per unit area of the toners which have the same hue and different densities and which constitute the toner image, is different when the toner image is formed on the basis of an input signal on a recording material which is a paper sheet and when the toner image is formed on the basis of the same input signal on a recording material which is an OHP sheet.

18 Claims, 14 Drawing Sheets

IMAGE FORMING APPARATUS USING TWO OR MORE TONERS FOR ORDINARY PAPER OR OHP SHEET

FIELD OF THE INVENTION AND RELATED ART

The present invention relates to an image forming apparatus which uses two or more toners identical in hue and different in color density. In particular, it relates to an image forming apparatus which uses two or more toners identical in hue and different in color density, and adjusts the sum of the two or more toners identical in hue and different in color density used for image formation per unit area of the recording medium.

In recent years, need has been increasing for improving an electrophotographic image forming apparatus in image quality.

However, the glossiness level of an image formed on recording medium is affected by the glossiness level of the recording medium itself, creating the problem that the variation in the glossiness level of recording medium itself prevents the formation of an image with the glossiness level desired by a user. Various images, except for solid images, formed on recording medium have many areas having no toner. Therefore, the glossiness levels of an image formed on recording medium are affected by the glossiness level of the recording medium itself.

Thus, the image forming apparatus disclosed in Japanese Laid-open Patent Application 2002-148893 uses two toners identical in hue and different in color density: toner higher in color density (which hereinafter will be referred to as high color density toner), and toner lower in color density (which hereinafter will be referred to as low color density toner), and uses such an image forming method that the low color density toner is used at a higher ratio per unit area of recording medium than the high color density toner. With the use of this method, the sum of the toners used per unit area of recording medium is greater than when the image formation method in accordance with the prior art in which two or more toners identical in hue and different in color density are not used, and therefore, the area of recording medium covered with no toner becomes smaller, reducing thereby the effect of the glossiness of recording medium itself upon the glossiness level of the image formed thereon.

However, this method of increasing the amount by which toner is placed on recording medium for image formation is problematic in that when the recording medium on which an image is formed is an OHP sheet, the image formed by projecting the image formed on the OHP sheet will not have the desired color.

SUMMARY OF THE INVENTION

Thus, the primary object of the present invention is to form an image on an OHP sheet, with the use of two or more toners identical in hue and different in color density, so that the image formed by projecting the image formed on the OHP sheet will have the desired color.

Another object of the present invention is to provide an image forming apparatus comprising:

an image bearing member;

an electrostatic latent image forming means for forming an electrostatic image on said image bearing member in response to input signals;

a developing means capable of developing an electrostatic image using two or more toners identical in hue and different in color density;

a toner image forming means for forming a toner image on recording medium; and a fixing means for fixing the toner image to recording medium, wherein the sum of the two or more toners identical in hue and different in color density used for forming an image on OHP sheet is different from the sum of the two or more toners identical in hue and different in color density used for forming an image on ordinary recording paper.

These and other objects, features, and advantages of the present invention will become more apparent upon consideration of the following description of the preferred embodiments of the present invention, taken in conjunction with the accompanying drawings.

DETAILED DESCRIPTION OF THE PREFERRED EMBODIMENTS

Figure 1:
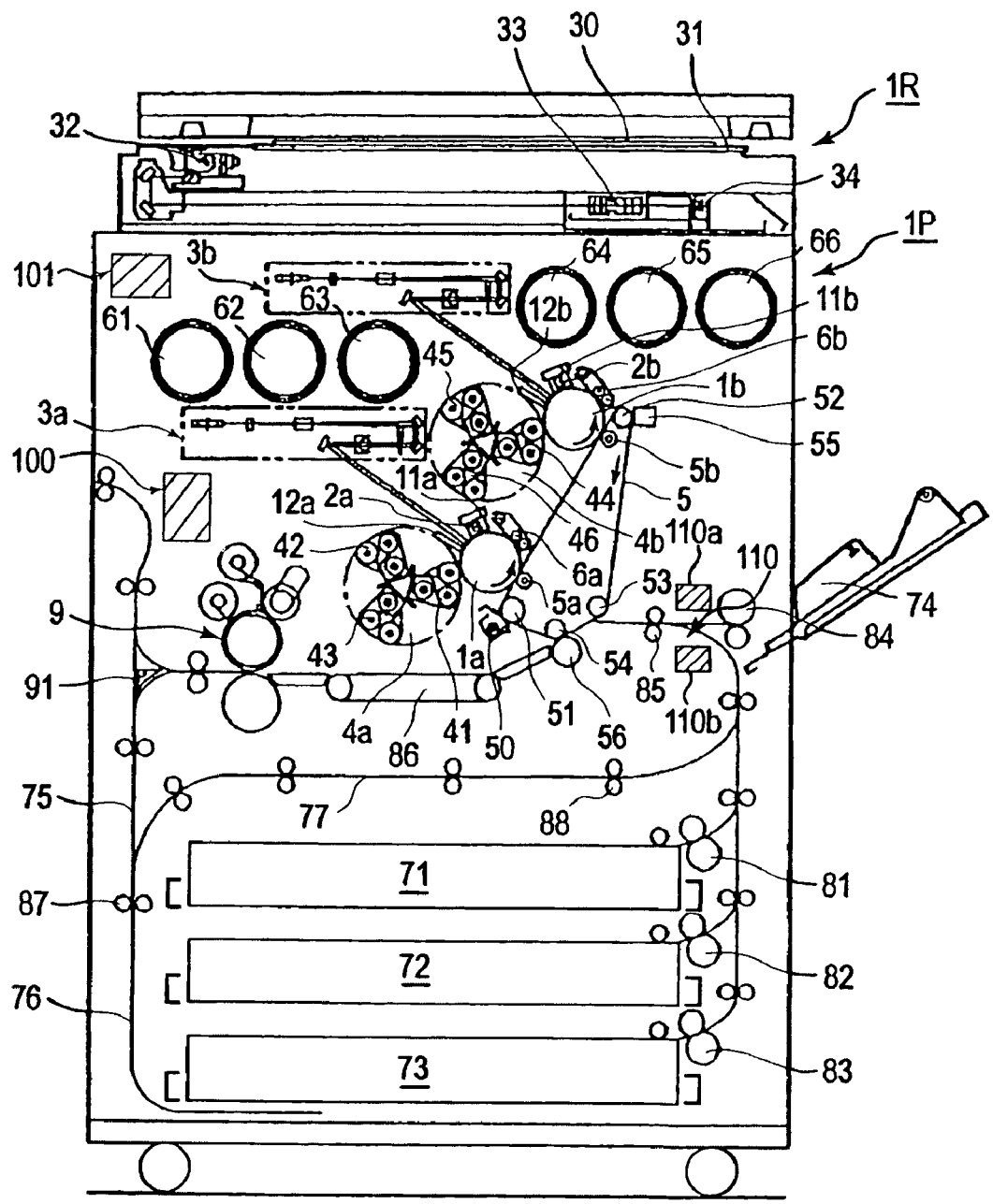
FIG. 1 is a schematic sectional view of the full-color image forming apparatus in the first embodiment of the present invention, depicting the general structure thereof.

According to one of the characteristic aspects of the present invention, the sum of the two or more toners identical in hue and different in color density used for forming an image on an OHP sheet from an electrostatic image, using an image forming apparatus which uses two or more toners identical in hue and different in color density, is made different from the sum of the two or more toners identical in hue and different in color density used for forming an image on a sheet of ordinary recording paper from the same electrostatic image, in terms of input signal level, as the electrostatic latent image used for forming an image on the OHP sheet.

Further, the sum of the two or more toners identical in hue and different in color density used, per unit area of recording medium, for forming an image on an OHP sheet is smaller than the sum of the two or more toners identical in hue and different in color density used per unit area of recording medium for forming an image on a sheet of ordinary recording paper.

Therefore, the image formed on the OHP sheet using the image forming method in accordance with the present invention is superior in light transmittance to that in accordance with the prior art, being therefore capable of forming an image with the desired color on a screen or the like when it is projected thereon.

Hereinafter, the preferred embodiments of the present invention will be described with reference to the appended drawings.

Incidentally, if a component, a member, a portion, or the like in one of the embodiments has the same reference character as one in another embodiment, the two are identical in structure and function. Thus, once they are described, their description will not be repeated.

Embodiment 1

FIG. 1 is a schematic sectional view of the electrophotographic full-color image forming apparatus in the first embodiment of the present invention, showing the general structure thereof. The full-color image forming apparatus in this embodiment comprises a digital color image reader 1R, which is located in the top portion of the apparatus, and a digital color image printing station 1P, which is in the bottom portion of the apparatus.

The image forming operation of this apparatus is as follows. That is, an original 30 is placed on the original placement glass platen 31 of the reader portion 1R, and the original 30 is scanned by an exposure lamp 32 so that the light reflected by the original 30 is focused onto the full-color CCD sensor 34 by a lens 33. As a result, video signals representing color components of the original 30 are obtained. These video signals are amplified by an unshown amplification circuit, and then, are sent to an unshown video processing unit, in which the signals are processed. Then, they are sent to the printing station 1P by way of an unshown image formation data storage portion.

To the printing station 1P, not only the signals from the reader portion 1R are sent, but also, the video signals from a computer, video signals from a facsimile machine, etc., are sent.

Here, however, the image forming operation of the image formation station 1P will be described assuming that video signals are sent from the reader portion 1R.

The printing station 1P comprises: a pair of photosensitive drums 1a and 1b as image bearing members; a pair of pre-exposure lamps 11a and 11b; a pair of primary charging devices 2a and 2b of a corona discharge type; a pair of laser based exposure optical systems 3a and 3b; a pair of potential level sensors 12a and 12b; a pair of rotaries 4a and 4b for holding developing apparatuses; and two sets of developing apparatuses (41, 42, and 43) and (44, 45, and 46) different in spectral characteristics and mounted in the rotary; a pair of transferring apparatuses 5a, and 5b; and a pair of cleaning devices 6a and 6b. The pair of photosensitive drums 1a and 1b are rotatably supported so that they can be rotated in the direction indicated in the drawing, and the other components are disposed in the adjacencies of the peripheral surfaces of the photosensitive drums 1a and 1b, in a manner to surround the photosensitive drums 1a and 1b.

The developing apparatuses 41–46 are filled with magenta toner (M), cyan toner (C), low color density magenta toner (LM), yellow toner (Y), black toner (K), and low color density cyan toner (LC), respectively. Incidentally, it is possible to equip the image forming apparatus with a developing apparatus containing toner of metallic color, for example, gold or silver color, a developing apparatus containing fluorescent toner, or the like, in addition to the aforementioned ones.

The developing apparatuses 41–46 in this embodiment contain two-component developer, that is, the mixture of toner and carrier. However, they may contain single-component developer. The employment of such developing apparatuses does not create any problem.

Further, the number of the developing apparatuses employed by the image forming apparatus in this embodiment is six. However, all that is necessary is that the number is no less than four; the number may be any number which is four or greater.

The video signals sent from the reader portion 1R are converted into optical signals by the unshown laser output portion of the laser based exposure optical systems 3a and 3b. The optical signals, that is, the beams of laser light modulated with the video signals, are deflected (reflected) by the polygon mirror, transmitted through the lens, deflected (reflected) by multiple mirrors, and then, are projected onto the peripheral surfaces of the photosensitive drums 1a and 1b.

When the printing station 1P is in operation, the photosensitive drum 1 (1a and 1b) is rotated in the direction indicated by an arrow mark. In terms of the image formation sequence, first, electrical charge is removed from the peripheral surface of the photosensitive drum 1 (1a and 1b) by the pre-exposure lamp 11 (11a and 11b). Then, the peripheral surface of the photosensitive drum 1 (1a and 1b) is uniformly charged by the primary charging device 2 (2a and 2b), and is exposed to a beam of laser light modulated with video signals corresponding to one of the color components of the original. As a result, an electrostatic image is formed on the peripheral surface of the photosensitive drum 1 (1a and 1b). The above-described steps are carried out for each of the color components into which an intended image is separated.

Next, the developing apparatus corresponding in color component to the electrostatic latent image on the photosensitive drum 1 (1a and 1b) is moved to the developing station by rotating the rotary 4 (4a and 4b). Then, this developing apparatus is operated to develop the latent image on the peripheral surface of the photosensitive drum 1 (1a and 1b) into a visible image (image formed of toner composed essentially of resin and pigment).

Since the image forming apparatus in this embodiment is structured as described above, the distances between its exposing stations and corresponding developing stations are equal regardless of the color of the image being formed, making it unlikely for the monochromatic images different in color to be become different in properties except for color.

Referring to FIG. 1, each developing apparatus is supplied with toner from one of toner storage portions 61–66 (hoppers) with a predetermined timing so that the toner ratio (or amount of toner) in the developing apparatus remains constant. The toner storage portions 61–66 are located next to the laser based exposure optical system 3a and 3b in terms of the horizontal direction.

The toner image having formed on the photosensitive drum 1 (1a and 1b) is transferred (primary transfer) onto an intermediary transfer belt 5 as an intermediary transferring member, by the transferring apparatus 5 (5a and 5b). Since multiple monochromatic images are formed to form a single full-color image, they are transferred in layers onto the intermediary transfer belt 5.

The intermediary transfer belt 5 is stretched around the driver roller 51, follower roller 52, roller 53, and roller 54, and is driven by the driver roller 51. On the opposite side of the intermediary transfer belt 5 from the driver roller 51, a transfer belt cleaning apparatus 50 is located, which can be placed in contact with, or separated from, the intermediary transfer belt 5.

On the opposite side of the intermediary transfer belt 5 from the follower roller 52, a sensor 55 for detecting the positional deviation and color density of the image having been transferred onto the intermediary transfer belt 5 from the photosensitive drum 1 (1a and 1b) is located, which provides information for continuously adjusting each image formation station in terms of color density, amount of toner supply, image writing timing, image writing start point, etc.

After the necessary number of monochromatic toner images different in color are transferred in layers onto the intermediary transfer belt 5, the transfer belt cleaning apparatus 50 is pressed against the driver roller 51 to remove the toner remaining on the intermediary transfer belt 5 after the transfer of the toner images from the intermediary transfer belt 5 onto a recording medium.

Meanwhile, from one of the recording medium storage portions 71, 72, and 73, or a manual feeding portion 74, recording mediums are conveyed, one by one, by one of the recording medium feeding means 81, 82, 83, and 84, respectively, to a pair of registration rollers 85, by which they are straightened if they are askew, and are released with a predetermined timing to be delivered to a secondary transfer station 56, in which the toner images on the intermediary transfer belt 5 are transferred onto one of the recording mediums. On the upstream side of the pair of registration rollers 85, a light transmittance detecting means 110 is located, which has a light emitting portion 110a and light receiving portion 110b, and detects the light transmittance of the recording medium, that is, the ratio of the amount of the light emitted by the light emitting portion 110a relative to the amount of the light received by the light receiving portion 110b.

After the toner images are transferred onto the given recording medium in the secondary transfer station 56, the recording medium is conveyed to a fixing apparatus 9 of a thermal roller type by way of a recording medium conveying portion 86. In the fixing apparatus 9, the toner images are fixed, and then, the recording medium is discharged into a delivery tray or a post-processing apparatus.

After the secondary transfer of the toner images, the toner remaining on the intermediary transfer belt 5 is removed by the transfer belt cleaning apparatus 50, and the intermediary transfer belt 5 is used again for the primary transfer process carried out in each of the image formation stations.

The operation for forming an image on both surfaces of a recording medium is as follows. Immediately after the transfer medium is passed through the fixing apparatus 9, the conveyance path guide 91 is driven, temporarily guiding the transfer medium into the reversing path 76 through the recording medium conveyance path 75. Then, the pair of reversing rollers 87 are rotated in reverse, conveying backward the transfer medium, that is, conveying the transfer medium in the direction opposite to the direction in which the transfer medium was guided into the reversing path 76, in other words, the end of the transfer medium, which was trailing when the transfer medium was guided into the reversing path 76, becoming the leading end. As a result, the transfer medium is moved into the two-sided print mode path 77. Thereafter, the transfer medium is conveyed by the pair of two-sided print mode rollers 88 to the aforementioned pair of registration rollers 85 through the two-sided print mode path 77. Then, it is straightened if it is askew, and is released with the predetermined timing, so that an image is transferred through the above-described image formation process, onto the opposite surface of the transfer medium from the surface on which an image has been already formed.

In this embodiment, the light transmittance of the recording medium on which an image is to be formed is detected by the light transmittance detecting apparatus 110, determining thereby whether the recording medium is ordinary recording paper or OHP sheet. The image forming apparatus in this embodiment is set up so that a recording medium that is no less than 50% in light transmittance is treated as an OHP sheet, whereas a recording medium that is no more than 50% is treated as an ordinary recording paper. Obviously, it is possible for a user to manually input the information regarding whether or not the recording medium on which an image is to be formed is an ordinary recording paper or an OHP sheet, into the apparatus controlling portion 101.

At this time, the image formation modes of the image forming apparatus in this embodiment will be described.

As described above, this image forming apparatus is provided with two cyan color toners, which are identical in hue and different in color density, that is, cyan color toner higher in color density (which hereinafter may be referred to as "high color density cyan toner") and cyan color toner lower in tone color density (which hereinafter may be referred to as "low color density cyan toner"), and two magenta color toners, which are identical in hue and different in color density, that is, magenta color toner higher in color density (which hereinafter may be referred to as "high color density magenta toner") and magenta color toner lower in color density (which hereinafter may be referred to as "low color density magenta toner").

The statement that two toners are identical in hue, but different in color density, ordinarily means that the two toners are identical in the spectral characteristics of the coloring ingredient contained in the toners composed essentially of resin and coloring ingredient (pigment), but are different in the amount of the coloring ingredient. In other words, the low color density toner means one of the two toners identical in hue, which is lower in color density than the other.

Further, the statement that two toners are identical in hue generally means that the two toners are identical in the spectral characteristics of the coloring ingredient (pigment) they contain. However, it includes the case in which in strict terms, the two toners are not identical in spectral characteristic of the coloring ingredient, but they are identical in terms of the ordinary perception of color, for example, magenta, cyan, yellow, black, etc.

As far as the present invention is concerned, when the two toners are identical in hue and different in color density, the statement that the toner is low in color density (low color density toner) means that when the amount of the toner used per unit area of recording medium is 0.5 mg/cm$^2$, the optical color density of the toner layer formed of this toner is no more than 0.1 after fixation, whereas the statement that the toner is high in color density (high color density toner) means that when the amount of the toner used per unit area of recording medium is 0.5 mg/cm$^2$, the optical color density of the toner layer formed of this toner is no less than 0.1 after fixation.

In this embodiment, the amount of the pigment in the high color density toner has been adjusted so that when the amount of this toner on a recording medium is 0.5 mg/cm$^2$, the optical color density of the toner layer formed of this toner will become 1.6 as the toner layer is fixed, whereas the amount of the pigment in the low color density toner has been adjusted so that when the amount of the toner on a recording medium is 0.5 mg/cm$^2$, the optical color density of the toner layer formed of this toner will become 0.8 as the toner layer is fixed. The high and low color density cyan toners, and high and low color density magenta toners, are skillfully used in combination, to achieve cyan and magenta colors different in tone gradation.

In the present invention, "OHP sheet" means transparent recording medium used with an overhead projector (OHP), an apparatus which projects an image formed on transparent recording medium onto a screen or the like, by projecting light through the combination of the transparent medium and the image thereon.

"Ordinary recording paper" means such recording medium on which an image is formed so that the image borne thereon can be directly looked at. Of the light projected upon the combination of the ordinary recording paper and the image borne thereon, the portion of the light reflected by the combination is visually sensed. The selection of ordinary recording paper is not limited to those composed of such fiber as pulp; it also includes those composed of resin.

Figure 2:
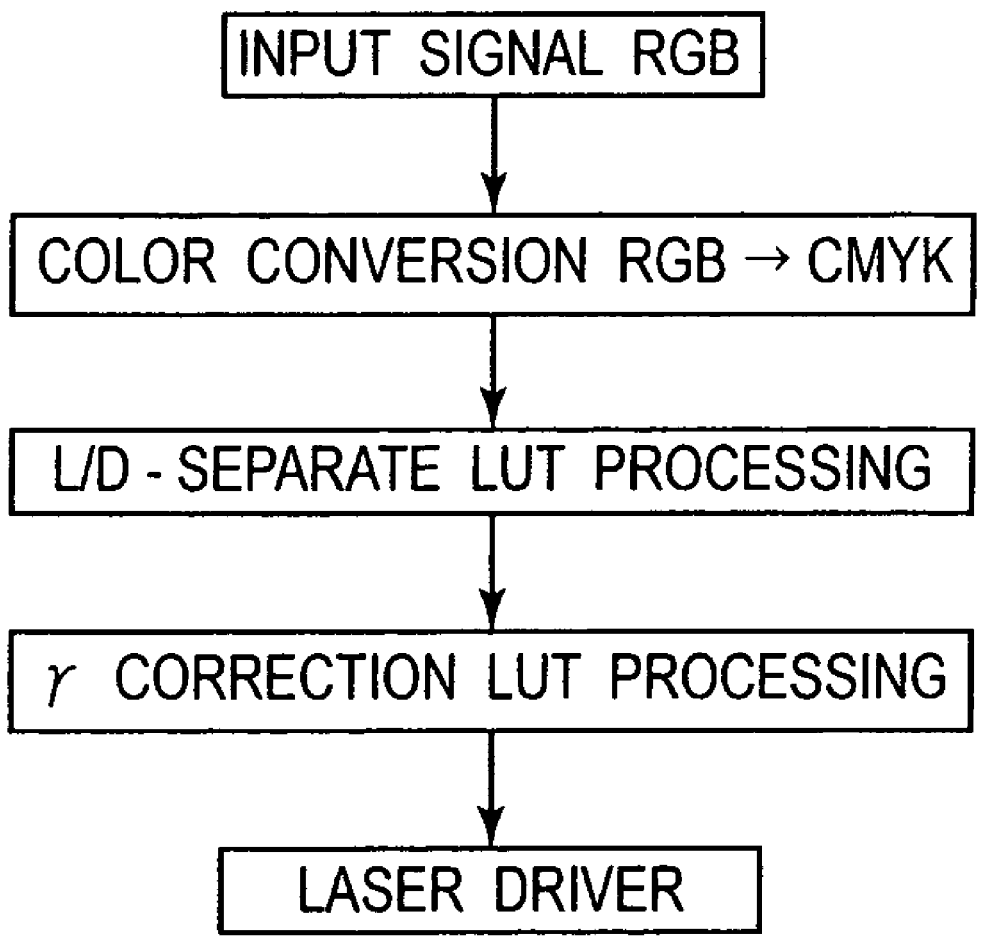
FIG. 2 is a basic flowchart of a method for controlling the image forming apparatus in accordance with the present invention.

Given in FIG. 2 is the basic flowchart followed by the image forming apparatus in this embodiment, for processing video signals.

Referring to FIG. 2, in this embodiment, the inputted video signals corresponding to the color components, such as R, G, B, etc., of an intended image, are converted in color into video signals representing C (cyan), M (magneta), Y (yellow), and K (black) color components. Then, the C, M, Y, and K video signals are separated in color density, based on a lookup table (which hereinafter will be referred to as LUT), such as the one shown in FIG. 4, which will be described later in more detail (video signal apportionment LUT process). Thereafter, the video signals representing the high color density and video signals representing the low color density are subjected to their own gamma correction processes, and are used to drive laser drivers in order to output images.

The vertical resolution of the image modulation method used by the image forming apparatus in this embodiment is 200 dpi.

At this time, the image forming operation of the image forming apparatus in this embodiment, for forming an image on an OHP sheet, for example, will be described.

When forming an image on an OHP sheet, if video signals are processed in the same manner as the one used for forming an image on a sheet of ordinary recording paper, following the flowchart in FIG. 2, the amount by which the toner is used, per unit area of recording medium, for forming the medium tone areas of the image becomes unnecessarily large. Therefore, the resultant image is inferior in reproducing colors as it is projected onto a screen or the like.

Figure 3:
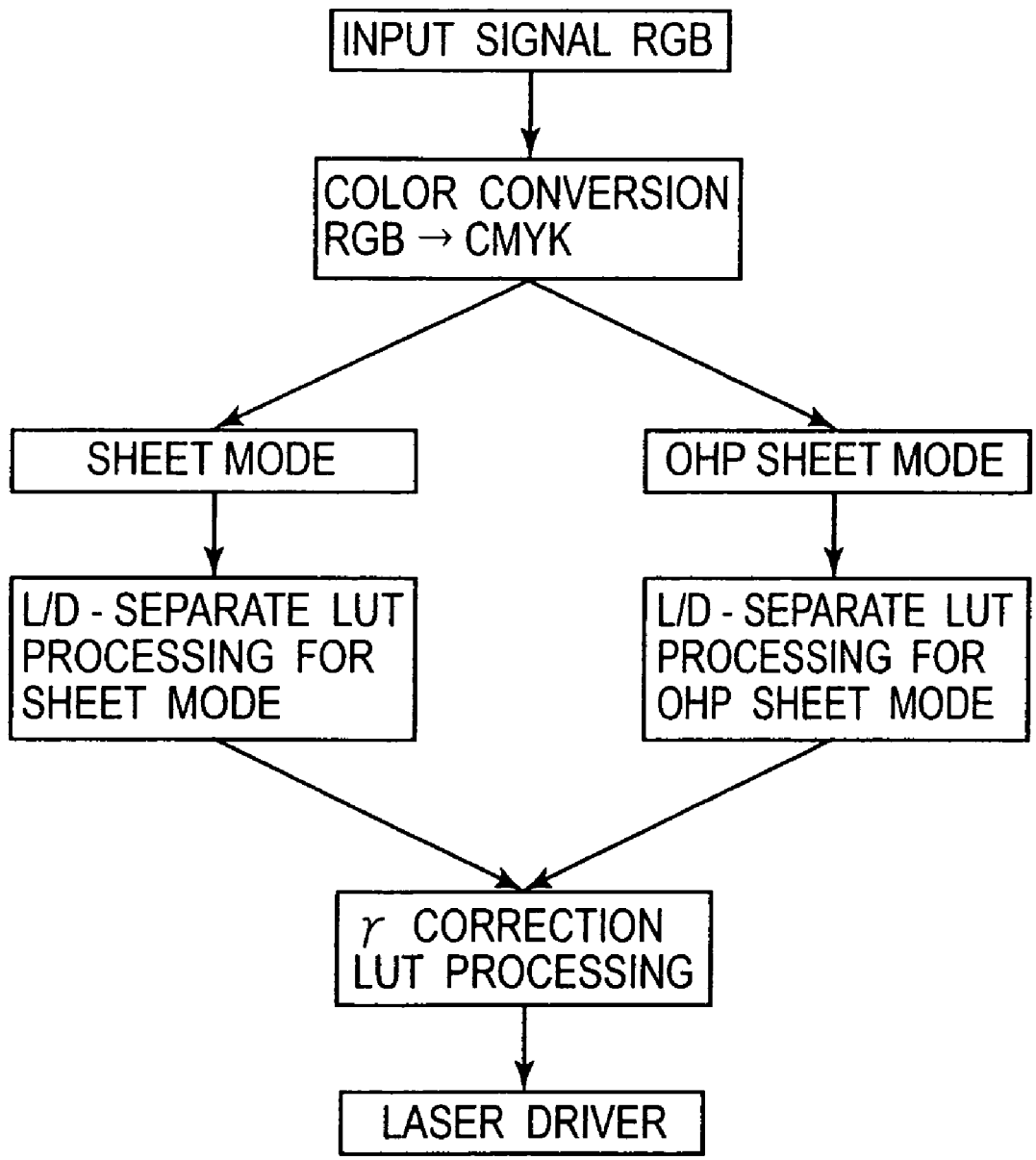
FIG. 3 is a flowchart for controlling the image forming apparatus in the first embodiment of the present invention.

FIG. 3 is the flowchart of the image forming operation of the image forming apparatus in this embodiment.

According to this embodiment, when the recording medium on which an image is to be formed is ordinary paper, the image forming apparatus is operated in the paper mode, whereas when the recording medium on which an image is to be formed is OHP sheet, the image forming apparatus is operated in the OHP sheet mode. The mode selecting means 100 selects the paper mode or OHP sheet mode based on the information from the light transmittance detecting apparatus 110. More specifically, when the light transmittance of a recording medium is no less than 50%, the mode selecting means 100 determines that the recording medium is an OHP sheet, and selects the OHP sheet mode, whereas when the light transmittance of a recording medium is no more than 50%, the mode selecting means determines that the recording medium is ordinary paper, and selects the paper mode. Further, the mode selecting means 100 is enabled to select the paper or OHP sheet mode based on the information manually inputted into the apparatus controlling portion 101 by a user.

Figure 4:
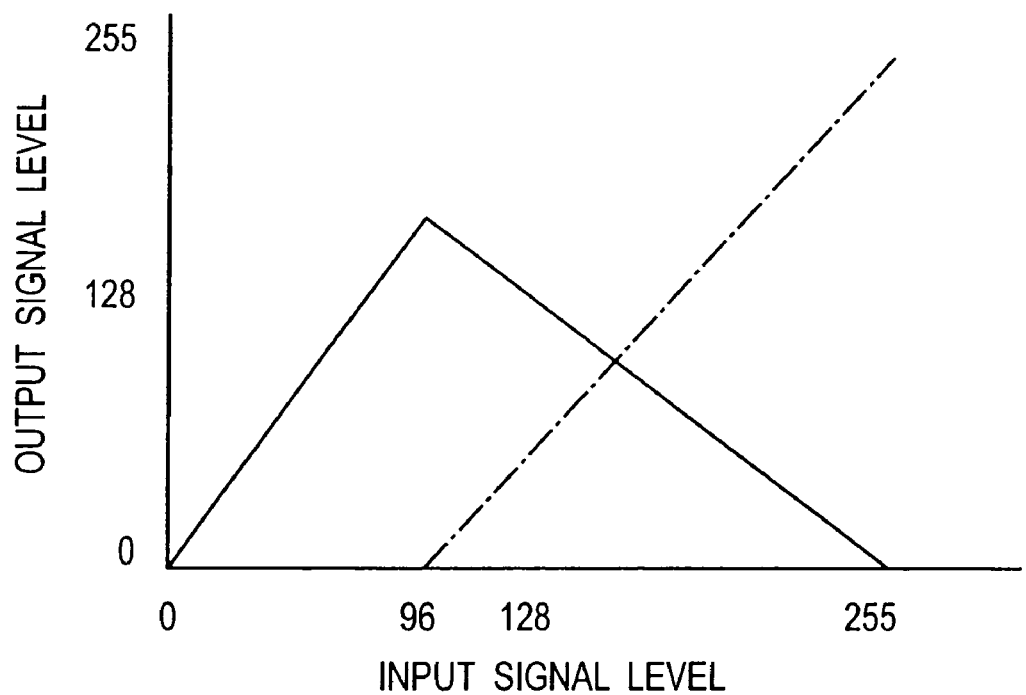
FIG. 4 is a graph showing the pattern of the lookup table (LUT) used for apportioning input signals between the high and low color density toners when forming an image on a sheet of recording paper using the image forming apparatus in accordance with the present invention.

The paper mode is the mode for forming an image on ordinary paper. In this mode, the video signal apportionment lookup table in FIG. 4 is used. That is, when the level (gradation) of an input signal is no more than 96, the high color density toner is not used; only the low color density toner is used. The high color density toner is used where the level of an input signal is 96 or higher, and the higher the level of an input signal, the greater the amount by which the high color density toner is used. On the other hand, where the input signal level is 96 or higher, the higher the input signal level, the smaller the amount by which the low color density toner is used.

The OHP sheet mode is the mode for forming an image on the above-described OHP sheet. In this mode, the video signals are apportioned using the video signal apportionment lookup table in FIG. 5. That is, the input signal level at or above which the high color density toner is used in this mode is lower than that in the paper mode; the high color density toner is used at an input signal level of 32 or higher. FIG. 6 shows the relationship between the sum of the high and low color density toners used per unit area of recording medium in the paper mode, and input signals, and the relationship between the sum of the high and low color density toners used per unit area of recording medium in the OHP sheet mode, and input signals. The sum of the high and low color density toners used per unit area of recording medium in the OHP sheet mode is smaller than the sum of the high and low color density toners used per unit area of recording medium in the paper mode. Therefore, the image formed on the OHP sheet is superior in terms of light transmission, being therefore capable of reproducing the desired colors as it is projected onto a screen or the like.

Figure 7:
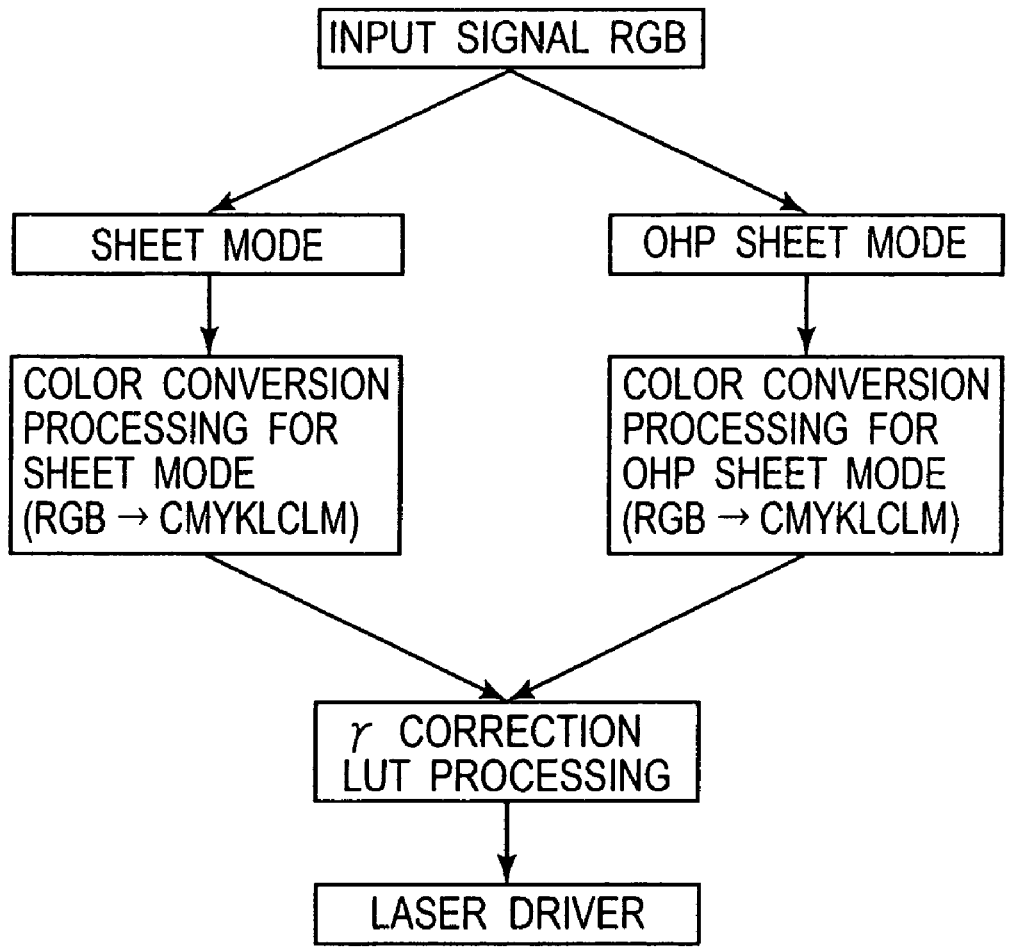
FIG. 7 is a flowchart for controlling the image forming apparatus in another embodiment of the present invention.

The above-described color conversion process and video signal apportionment process (LUT process) may be replaced with the direct mapping process represented by the flowchart shown in FIG. 7. Tn this case, the difference between the paper mode and OHP sheet mode is the same as the one described above. This direct mapping process is such a process that directly converts the RGB inputs into six colors, or the C (cyan), M (magenta), Y (yellow), K (black), LC (low color density cyan), and LM (low color density magenta). Further, the mapping process is changed according to the print mode; the image forming apparatus is designed so that when the apparatus is in the OHP sheet mode, the amount of the low color density toner used for image formation is smaller than when the apparatus is in the paper mode.

Embodiment 2

The image forming apparatus in this embodiment is identical in structure to the one in the first embodiment. In this embodiment, however, when forming an image on ordinary paper or OHP sheet, the image forming apparatus is controlled using the method different from the one used in the first embodiment. Next, this method for controlling the image forming apparatus when forming an image in the paper or OHP sheet mode will be described.

Figure 8:
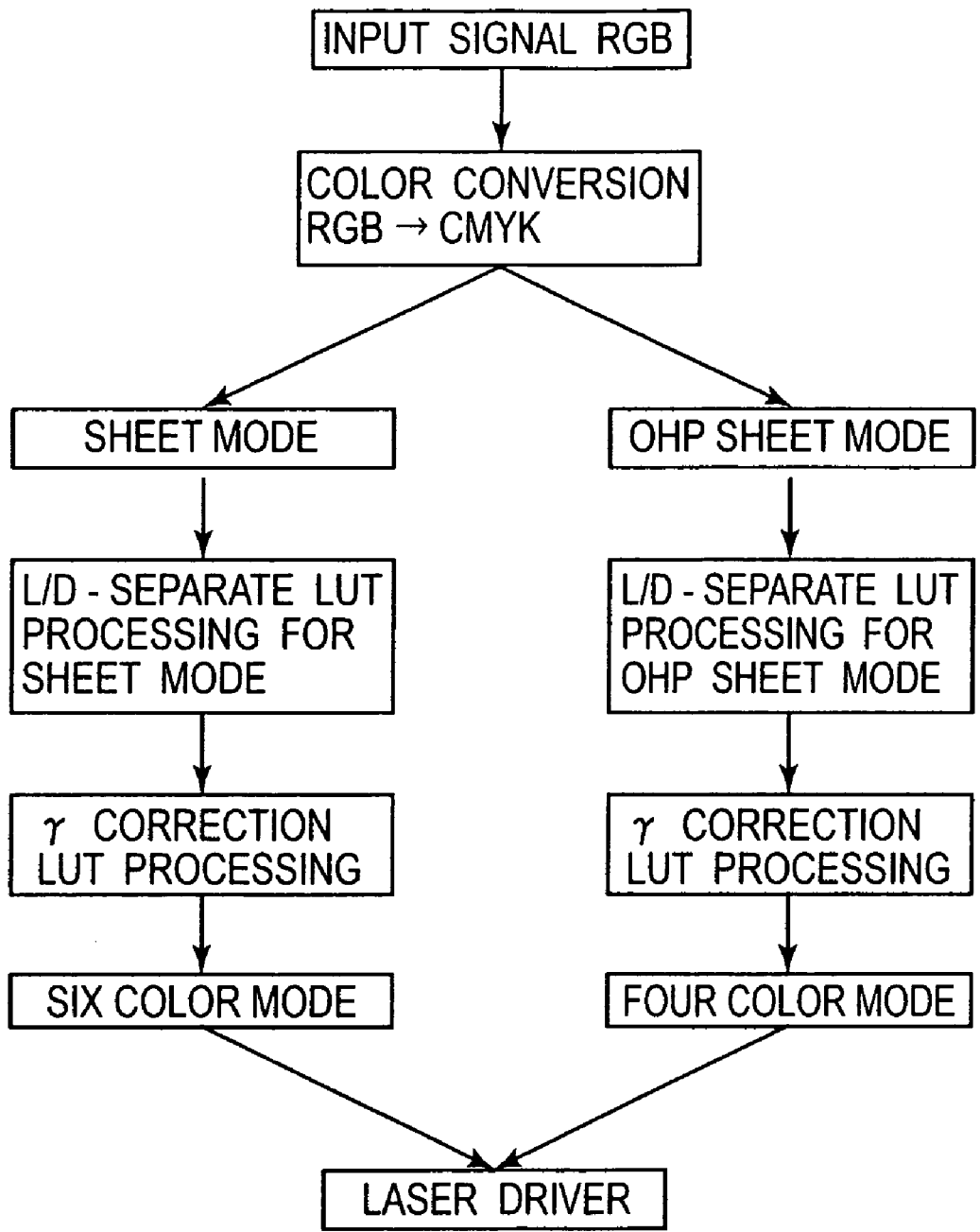
FIG. 8 is a flowchart for controlling the image forming apparatus in another embodiment of the present invention.

FIG. 8 is a flowchart for the image forming operation in this embodiment.

If a piece of ordinary paper is selected as the recording medium on which an image is formed by the image forming apparatus in this embodiment, the paper mode is selected by the mode selecting means 100, and the same video signal apportionment lookup table as the one used in the first embodiment, that is, the lookup table in FIG. 4, is used.

Figure 9:
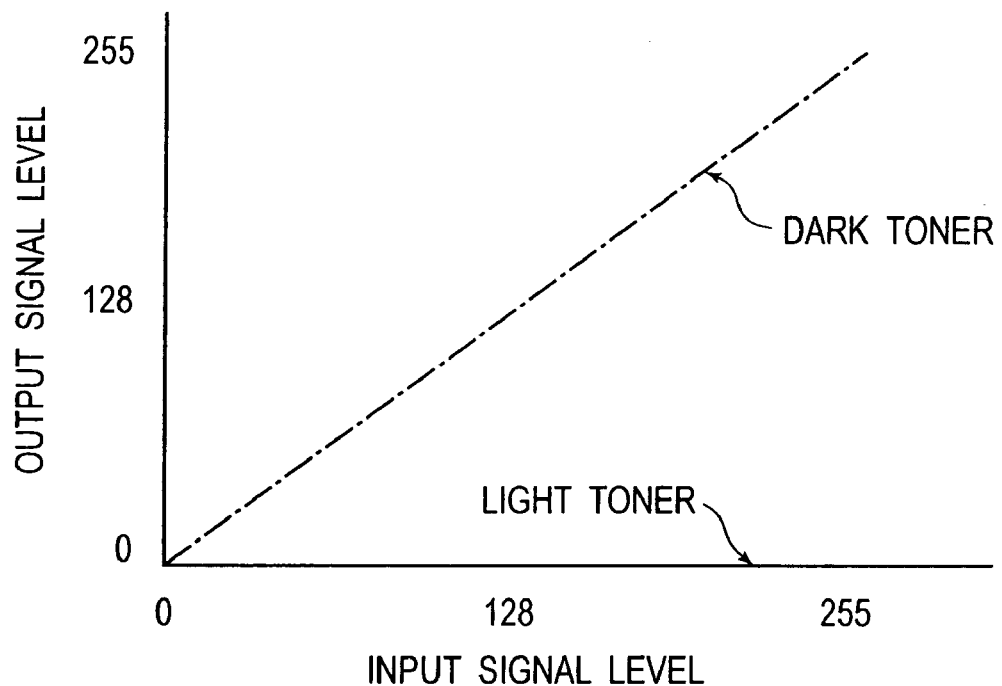
FIG. 9 is a graph showing the pattern of another video signal apportionment lookup table (LUT) used for forming an image on an OHP sheet using the image forming apparatus in accordance with the present invention.
Figure 10:
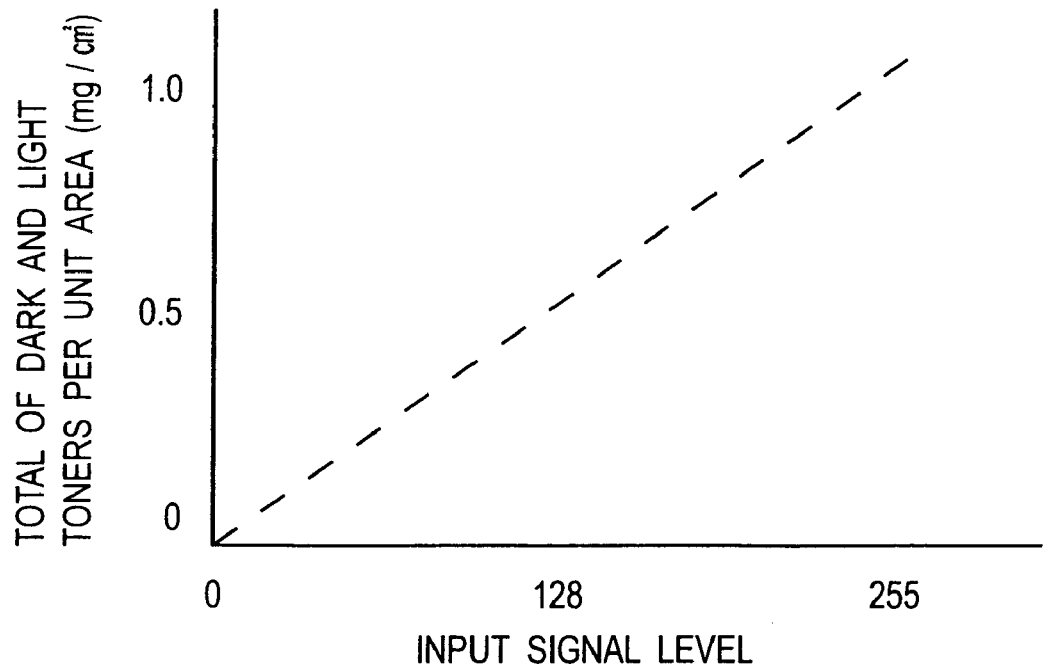
FIG. 10 is a graph showing relationships between the sum of the high and low color density toners placed on recording medium per unit area of recording medium, and input signal level, when the video signal apportionment lookup table shown in FIG. 9 is used.

On the other hand, if an OHP sheet is selected as the recording medium on which an image is formed by the image forming apparatus in this embodiment, the OHP sheet mode is selected by the mode selecting means 100. In the OHP sheet mode, the video signals are apportioned using the video signal apportionment lookup table in FIG. 9. This means that in the OHP sheet mode, the low color density toner is not used for image formation. In other words, if the OHP sheet mode is selected, the low color density toners are not used for development; an image is formed using only four toners: cyan, magenta, yellow, and black toners with the high color density. FIG. 10 shows the relationship between the sum of the high and low color density toners used when the video signal apportionment lookup table in FIG. 9 is used, and input signal level.

As will be evident from FIG. 10, in this embodiment, when forming an image in the OHP sheet mode, the low color density toner is not used. Therefore, it is possible to minimize the amount by which the toner highly influential to the color reproducibility of an image formed on OHP sheet is used per unit area of recording medium.

Further, in the OHP sheet mode, only four toners different in color are used to form an image. Therefore, the time it takes to form an image in the OHP sheet mode is shorter than that in the paper mode; the time it takes to form an image using four toners different in color is shorter than that for forming an image using six toners different in color or color density.

As described above, in this embodiment, the video signal apportionment process carried out in the OHP sheet mode, based on a lookup table, is made different from that in the paper mode; in the OHP sheet mode, an image is formed using only four toners different in color. Therefore, images optimal in quality are yielded whether the recording medium used for the image formation is ordinary paper or an OHP sheet. In particular, in the OHP sheet mode, it is possible to yield images superior in terms of the colors it reproduces when it is projected onto a screen or the like, and also, to reduce the image formation time.

Figure 11:
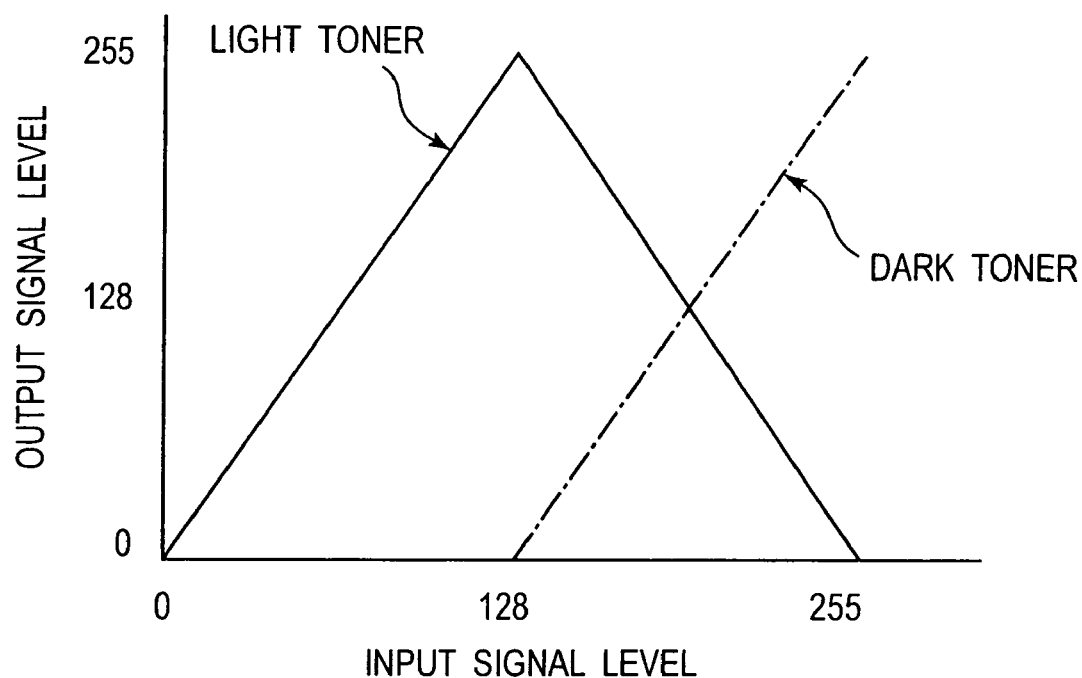
FIG. 11 is a graph showing the pattern of another video signal apportionment lookup table (LUT) used for forming an image on a sheet of ordinary recording paper using the image forming apparatus in accordance with the present invention.
Figure 12:
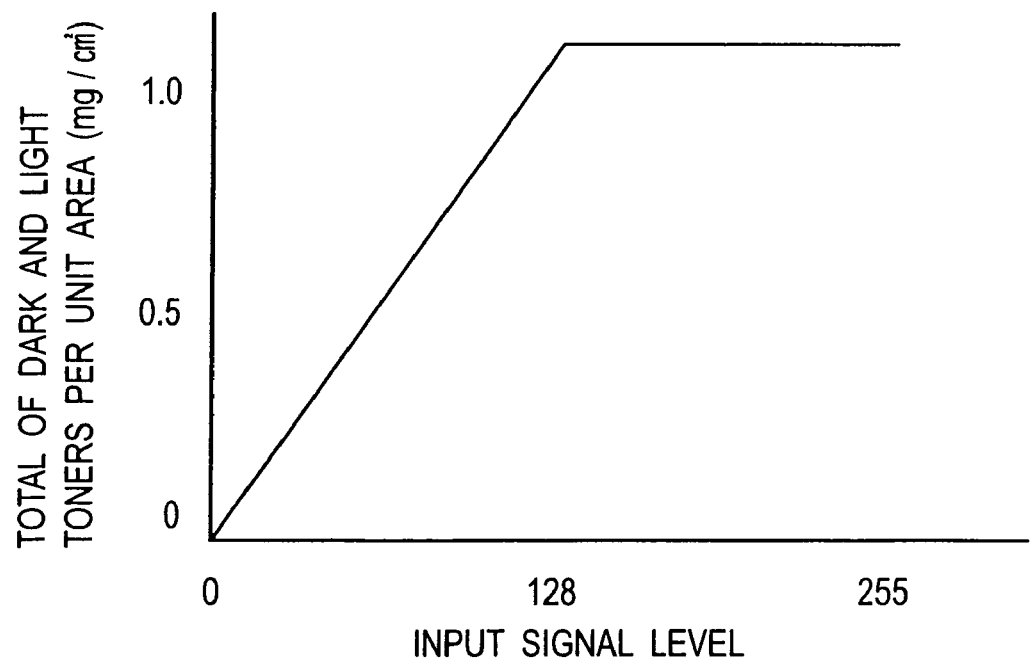
FIG. 12 is a graph showing the relationships between the sum of the high and low color density toners placed on recording medium per unit area of recording medium, and input signal level, when the video signal apportionment lookup table in FIG. 11 is used.

Incidentally, it is possible to use the video signal apportionment lookup table in FIG. 11, as the video signal apportionment lookup table for the paper mode. When this video signal apportionment lookup table is used in the paper mode, the high color density toner is not used unless the input signal level is 128 or higher; when the input signal level is less than 128, only the low color density toner is used. The high color density toner is used when the input signal level is 128 or higher, and the higher the signal level, the greater the amount by which the high color density toner is used. In comparison, in the case of the low color density toner, where the input signal level is 128 or higher, the higher the input signal level, the smaller the amount by which the low color density toner is used. Referring to FIG. 12, where the input signal level is 128 or higher, the sum of the high and low color density toners per unit area of recording medium are roughly the same regardless of the input signal level. Therefore, not only is an image less likely to be affected by the glossiness level of the recording medium on which the image is formed, but also, it is possible to form images superior in terms of the colors it reproduces as it reflects light.

In this embodiment, two toners (high and low color density toners) identical in hue and different in color density are used. However, it is possible to use three or more toners identical in hue and different in color density.

FIG. 1 shows an image forming apparatus, three of the toners used by which are identical in hue and different in color density. More specifically, the image forming apparatus shown in FIG. 1 uses yellow toner, magenta toner, black toner, high color density cyan toner, low color density cyan toner, and super low color density cyan toner. In other words, it uses three cyan toners different in color density.

The high color density cyan toner is adjusted in pigment so that when the amount of this toner deposited per unit area of recording medium is 0.5 mg/cm$^2$, the optical color density level of the toner layer (toner image) formed of this toner will become 1.6 as the toner layer is fixed. The low color density cyan toner is adjusted in pigment so that when the amount of this toner deposited per unit area of recording medium is 0.5 mg/cm$^2$, the optical color density level of the toner layer (toner image) formed of this toner will become 0.8 as the toner image is fixed. Further, the super low color density cyan toner is adjusted in pigment so that when the amount of this toner deposited per unit area of recording medium is 0.5 mg/cm$^2$, the optical color density level of the toner layer (toner image) formed of this toner will become 0.4 as the toner layer is fixed. In the developing apparatuses 41–46 of this image forming apparatus, magenta toner, high color density cyan toner, super low color density cyan toner, yellow toner, black toner, and low color density cyan toner, are stored, respectively. The image forming method employed by this image forming apparatus shown in FIG. 1 when its six developing apparatuses are filled with the above-listed toners, one for one, is the same as the one employed when the six developing apparatuses of this image forming apparatus are filled with the yellow toner, cyan toner, magenta toner, black toner, low color density cyan toner, and low color density magenta toner, one for one.

Figure 5:
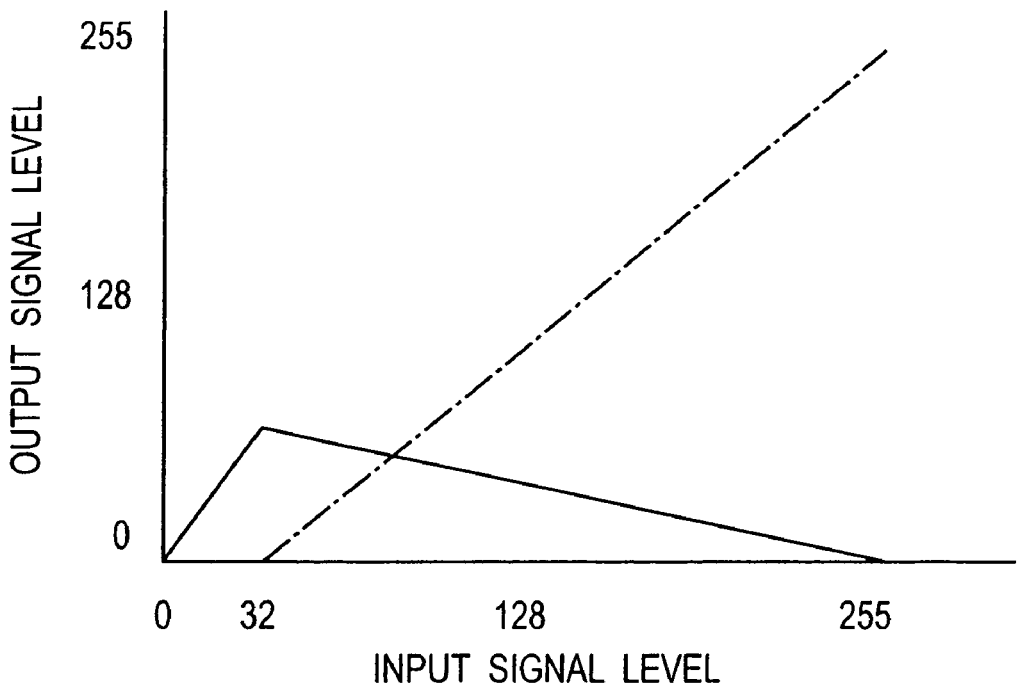
FIG. 5 is a graph showing the pattern of the lookup table (LUT) used for apportioning input signals between the high and low color density toners when forming an image on an OHP sheet using the image forming apparatus in accordance with the present invention.
Figure 6:
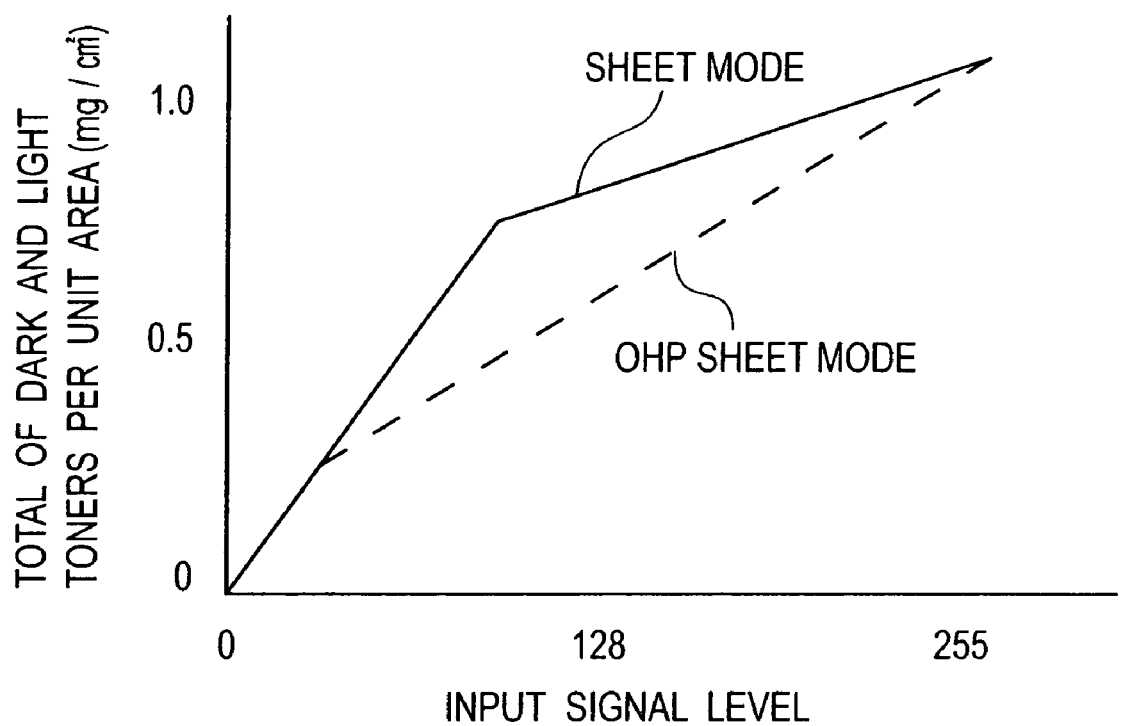
FIG. 6 is a graph showing relationships between the sum of the high and low color density toners placed on recording medium per unit area of recording medium, and input signal level, when the input signal apportionment lookup tables in FIGS. 4 and 5 are used.

FIG. 5 is the LUT used by this image forming apparatus which uses three cyan toners different in color density.

Figure 13:
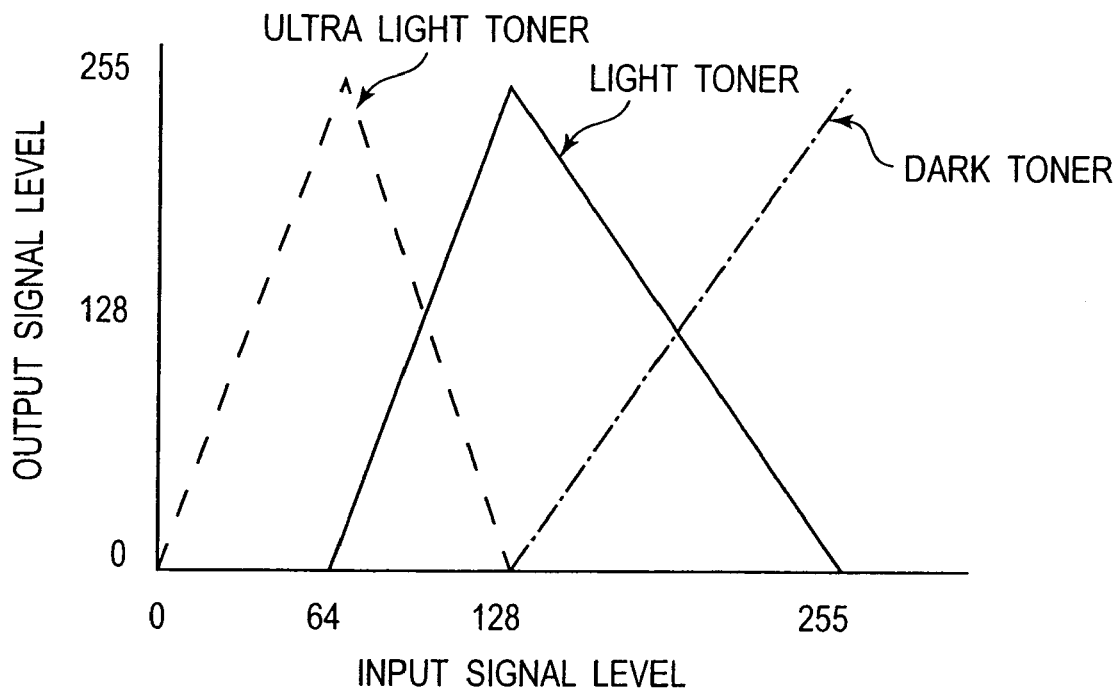
FIG. 13 is a graph showing the pattern of the video signal apportionment lookup table used for forming an image on a sheet of ordinary recording paper using an image forming apparatus, in accordance with the present invention, which uses three toners identical in hue and different in color density.

FIG. 13 shows the video signal apportionment lookup table used by the aforementioned image forming apparatus having three cyan toners different in color density when the apparatus is in the normal paper mode. In this case, where the input signal level is 64 or higher, the sum of the high and low color density toners used per unit area of recording medium is roughly the same regardless of the input signal level.

Figure 14:
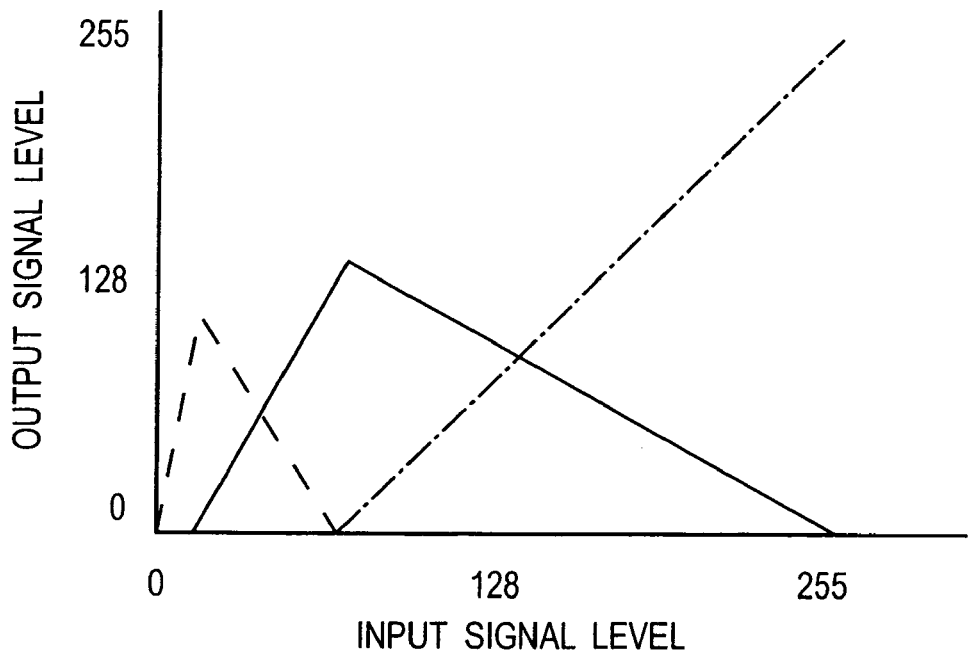
FIG. 14 is a graph showing the pattern of the video signal apportionment lookup table used for forming an image on an OHP sheet using an image forming apparatus, in accordance with the present invention, which uses three toners identical in hue and different in color density.
Figure 15:
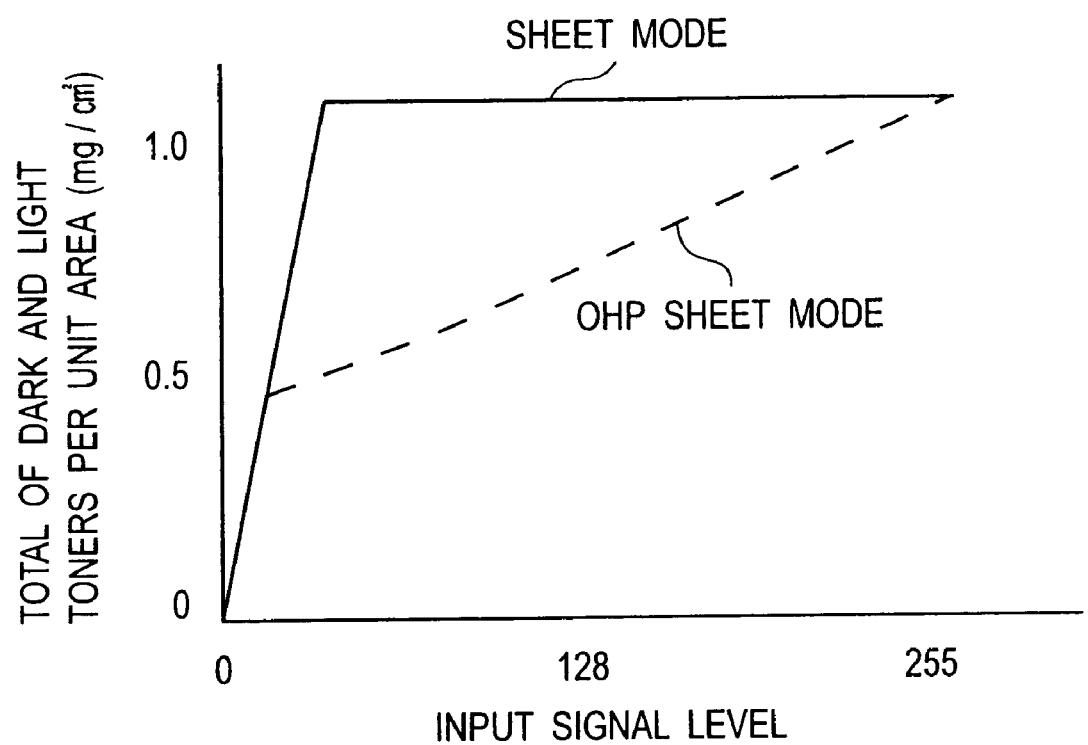
FIG. 15 is a graph showing relationships between the sum of the high and low color density toners placed on recording medium per unit area of recording medium, and input signal level, when the video signal apportionment lookup tables in FIGS. 13 and 14 are used.

FIG. 14 shows the video signal apportionment lookup table used by the aforementioned image forming apparatus having three cyan toners different in color density when the apparatus is in the OHP sheet mode. FIG. 15 shows the relationship between the sum of the high, low, and super low color density toners used per unit area of recording medium when the video signal apportionment lookup tables in FIGS. 13 and 14 are used, and the input signal level. Even when three cyan toners different in color density are used, the total amount by which the three toners are used per unit area of recording medium in the OHP sheet mode is smaller than that in the paper mode. Therefore, the image formed on the OHP sheet is superior in terms of light transmission, being therefore capable of reproducing the desired colors when it is projected onto a screen or the like. Similarly, even if four or more toners identical in hue and different in color density are used, the same effects as those described above can be obtained.

When the video signal apportionment lookup table in FIG. 13 is used in the paper mode, the video signal apportionment lookup table in FIG. 5 which uses both the high and low color density toners, or the video signal apportionment lookup table in FIG. 9 which uses only the high color density toner, may be used as the video signal apportionment table to be used in the OHP sheet mode.

Embodiment 3

Figure 16:
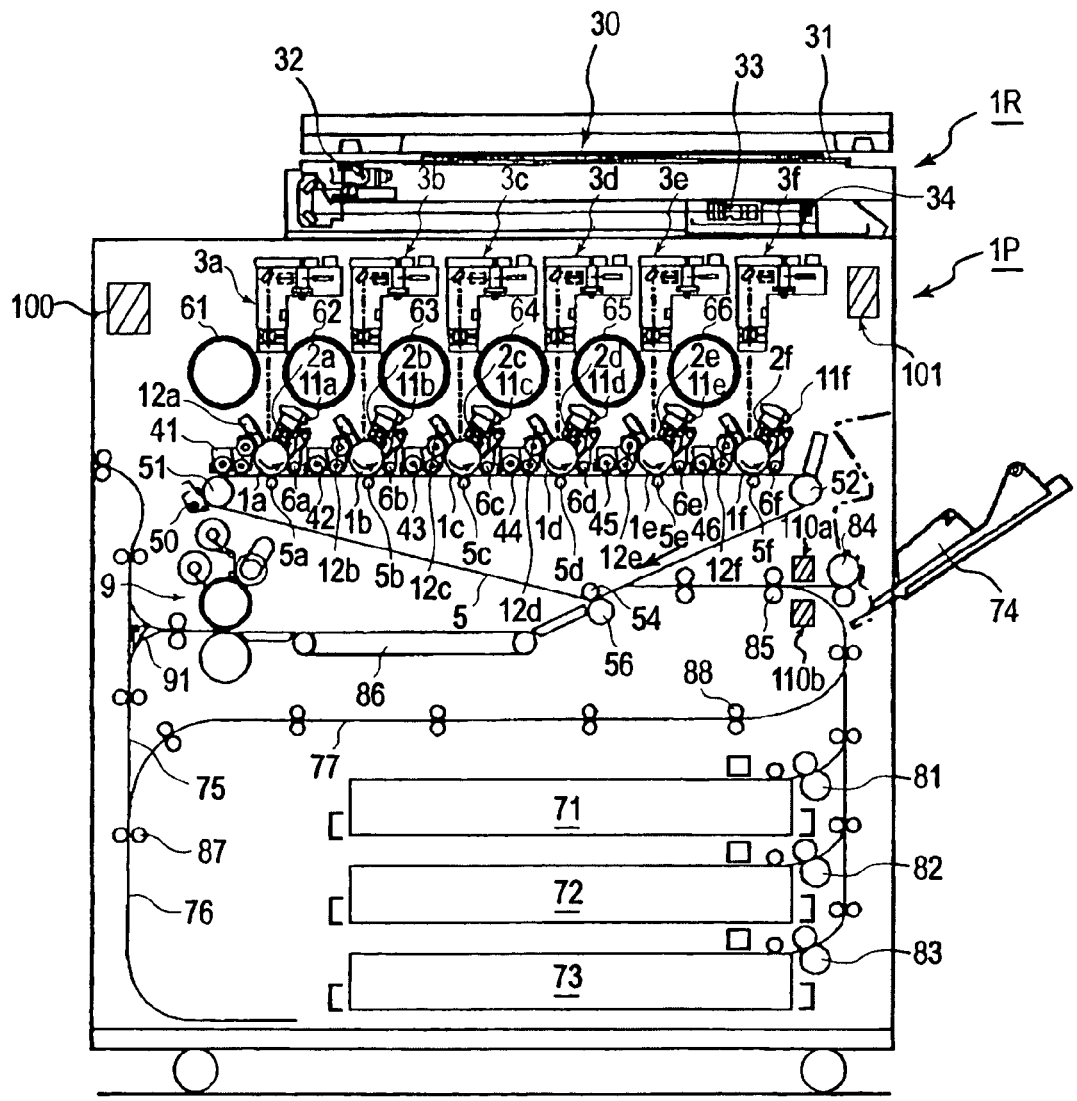
FIG. 16 is a schematic sectional view of the full-color image forming apparatus in another embodiment of the present invention.

FIG. 16 is a schematic sectional view of the image forming apparatus in another embodiment of the present invention, showing the general structure thereof. The image forming apparatus in this embodiment is of a tandem type having six image bearing members 1a, 1b, 1c, 1d, 1e, and 1f.

The components, members, portions, etc., of this image forming apparatus, identical in function to those of the image forming apparatus in the first embodiment, will be given the same reference characters as those given in the first embodiment. Next, the structure of this image forming apparatus will be described.

Referring to FIG. 16, the image forming apparatus has six developing apparatuses, and six photosensitive drums as image bearing members.

In other words, the image forming apparatus in this embodiment is a full-color image forming apparatus. It comprises a digital color image reader 1R, which is located in the top portion of the apparatus, and a digital color image printing station 1P, which is in the bottom portion of the apparatus.

The image forming operation of this apparatus is as follows. That is, an original 30 is placed on the original placement glass platen 31 of the reader portion 1R, and the original 30 is scanned by an exposure lamp 32 so that the light reflected by the original 30 is focused onto the full-color CCD sensor 34 by a lens 33. As a result, electrical signals (video signals) representing color components of the original 30 are obtained. These video signals are amplified by an unshown amplification circuit, and then, are sent to an unshown video processing unit, in which the signals are processed. Then, they are sent to the printing station 1P by way of an unshown image formation data storage.

To the printing station 1P, not only are the signals from the reader portion 1R sent, but also, the video signals from a computer, video signals from a facsimile machine, etc., are sent.

However, the image forming operation of the image formation station 1P will be described assuming that video signals are sent from the reader portion 1R.

The printing station 1P comprises: the six photosensitive drums 1 (1a, 1b, 1c, 1d, 1e, and 1f) as image bearing members; six pre-exposure lamps 11 (11a 11b, 11c, 11d, 11e, and 11f); six primary charging devices 2 (2a, 2b, 2c, 2d, 2e, and 2f) of a corona discharge type; six laser based exposure optical systems 3 (3a, 3b, 3c, 3d, 3e, and 3f); six potential level sensors 12 (12a, 12b, 12c, 12d, 12e, and 12f); six developing apparatuses (41, 42, 43, 44, 45, and 46) containing six toners different in spectral characteristic, one for one; six transferring apparatuses 5 (5a, 5b, 5c, 5d, 5e, and 5f); and six cleaning devices 6 (6a, 6b, 6c, 6d, 6e, and 6f. The six photosensitive drums 1 (1a, 1b, 1c, 1d, 1e, and 1f) are rotatably supported so that they can be rotated in the direction indicated in the drawing, and the other components are disposed in the adjacencies of the peripheral surfaces of the corresponding photosensitive drums 1 (1a, 1b, 1c, 1d, 1e, and 1f), in a manner to surround the photosensitive drums 1 (1a, 1b, 1c, 1d, 1e, and 1f), one for one.

In this embodiment, the six image bearing members 1 (1a, 1b, 1c, 1d, 1e, and 1f), and the six pre-exposure lamps 11, six primary charging devices 2 of a corona discharge type, six laser based exposure optical systems 3, six potential level sensors 12, six developing apparatuses 41, 42, 43, 44, 45, and 46, six transferring apparatus 5, and six cleaning devices 6, which are located in the adjacencies of the peripheral surfaces of the six image bearing members 1, one for one, in a manner to surround the image bearing members 1, make up six image formation stations. However, the number of the image formation stations does not need to be limited to six. It may be any number no less than four.

The developing apparatuses 41, 42, 43, 44, 45, and 46 are filled with low color density magenta toner (LM), low color density cyan toner (LC), yellow toner (Y), magenta toner (M), cyan toner (C), and black toner (K), respectively.

The developing apparatuses 41–46 in this embodiment contain two-component developer, or the mixture of toner and carrier. However, they may contain single-component developer. The employment of such developing apparatuses does not create any problem. In this embodiment, the same developers as those in the first embodiment, that is, magenta toner (M), cyan toner (C), yellow toner (Y), low color density magenta toner (LM), low color density cyan toner (LC), and black toner (K), are used.

The video signals sent from the reader portion 1R are converted into optical signals by the laser based exposure optical systems, that is, scanners 3 (3a, 3b, 3c, 3d, 3e, and 3f). The optical signals, that is, the beams of laser light modulated with the video signals, are deflected (reflected) by the polygon mirror, transmitted through the lens, deflected (reflected) by multiple mirrors, and then, are projected onto the peripheral surfaces of the photosensitive drums 1 (1a, 1b, 1c, 1d, 1e, and 1f).

When the image formation stations 1P of the printer are in operation, the photosensitive drum 1 (1a, 1b, 1c, 1d, 1c, and 1f) is rotated in the direction indicated by an arrow mark. In terms of the image formation sequence, first, electrical charge is removed from the photosensitive drum 1 (1a, 1b, 1c, 1d, 1e, and 1f) by the pre-exposure lamp 11 (11a, 11b, 11c, 11d, 11e, and 11f). Then, the photosensitive drum 1 (1a, 1b, 1c, 1d, 1e, and 1f) is uniformly charged by the primary charging device 2 (2a, 2b, 2c, 2d, 2e, and 2f), and is exposed to the exposure light corresponding to a specific toner among the aforementioned six toners. As a result, an electrostatic image is formed on the peripheral surface of the photosensitive drum 1 (1a, 1b, 1c, 1d, 1e, and 1f).

Next, the developing apparatuses 41, 42, 43, 44, 45, and 46 are made to operate to develop the latent images on the peripheral surfaces of the photosensitive drums 1 (1a, 1b, 1c, 1d, 1e, and 1f) into visible images (images formed of toner composed essentially of resin and pigment).

Referring to FIG. 16, each developing apparatus is supplied with toner from one of toner storage portions 61–66 (hoppers) with a predetermined timing so that the toner ratio (or amount of toner) in the developing apparatus remains constant. The toner storage portions 61–66 are located immediately next to the laser based exposure optical systems 3.

The toner images having been formed on the photosensitive drums 1 (1a, 1b, 1c, 1d, 1e, and 1f) are sequentially transferred in layers (primary transfer) onto an intermediary transfer belt 5 as an intermediary transferring member, by the transferring apparatuses 5 (5a, 5b, 5c, 5d, 5e, and 5f).

The intermediary transfer belt 5 is stretched around the driver roller 51, follower roller 52, and roller 54, and is driven by the driver roller 51. On the opposite side of the intermediary transfer belt 5 from the driver roller 51, a transfer belt cleaning apparatus 50 is located, which can be placed in contact with, or separated from, the intermediary transfer belt 50.

After the necessary number of monochromatic toner images different in color are transferred in layers onto the intermediary transfer belt 5, the transfer belt cleaning apparatus 50 is pressed against the driver roller 51 to remove the toner remaining on the intermediary transfer belt 5 after the transfer of the toner images from the intermediary transfer belt 5 onto a recording medium.

Meanwhile, from one of the recording medium storage portions 71, 72, and 73, or a manual feeding portion 74, recording mediums are conveyed, one by one, by one of the recording medium feeding means 81, 82, 83, and 84, respectively, to a pair of registration rollers 85, by which the recording mediums are straightened if they are askew, and are released with a predetermined timing to be delivered to a secondary transfer station 56, in which the toner images on the intermediary transfer belt 5 are transferred onto one of the recording mediums.

After the toner images are transferred onto the recording medium in the secondary transfer station 56, the recording medium is conveyed to a fixing apparatus 9 of a thermal roller type by way of a recording medium conveying portion 86. In the fixing apparatus 9, the toner images are fixed, and then, the recording medium is discharged into a delivery tray or a post-processing apparatus.

After the secondary transfer of the toner images, the toner remaining on the intermediary transfer belt 5 is removed by the transfer belt cleaning apparatus 50, and then, the intermediary transfer belt 5 is used again for the primary transfer process carried out in each of the image formation stations.

The operation for forming an image on both surfaces of a recording medium is as follows. Immediately after the transfer medium is passed through the fixing apparatus 9, the conveyance path guide 91 is driven, temporarily guiding the transfer medium into the reversing path 76 through the recording medium conveyance path 75. Then, the pair of reversing rollers 87 are rotated in reverse, conveying backward the transfer medium, that is, conveying the transfer medium in the direction opposite to the direction in which the transfer medium is guided into the reversing path 76, in other words, the end of the transfer medium, which was trailing when the transfer medium was guided into the reversing path 76, becoming the leading end. As a result, the transfer medium is moved into the two-sided print mode path 77. Thereafter, the transfer medium is conveyed by the pair of two-sided print mode rollers 88 to the aforementioned pair of registration rollers 85 through the two-sided print mode path 77. Then, it is straightened by the registration rollers 85 if it is askew, and is released with the predetermined timing, so that an image is transferred through the above-described image formation process, on the opposite surface of the transfer medium from the surface on which an image has been already formed.

This embodiment may be summarized as follows. The light transmittance of the recording medium to be used for image formation is detected by the light transmittance detecting apparatuses 110, determining thereby whether the recording medium is normal paper or OHP sheet. In the case of the image forming apparatus in this embodiment, a recording medium, the light transmittance of which is no less than 50%, is treated as an OHP sheet, and a recording medium, the light transmittance of which is no more than 50% is treated as an ordinary paper. Obviously, the information regarding whether or not the recording medium to be used for image formation is ordinary paper or OHP sheet may be manually inputted by a user into the apparatus controlling portion 101. The mode selecting means 100 chooses the paper mode or OHP sheet mode based on whether the recording medium to be used for image formation is ordinary paper or OHP sheet.

The effects as those attained by the image forming apparatuses in the first and second embodiments can also be attained by the color image forming apparatus in this embodiment, by controlling the image forming apparatus in this embodiment using the same image formation controlling method as those used in the first and second embodiments.

Figure 17:
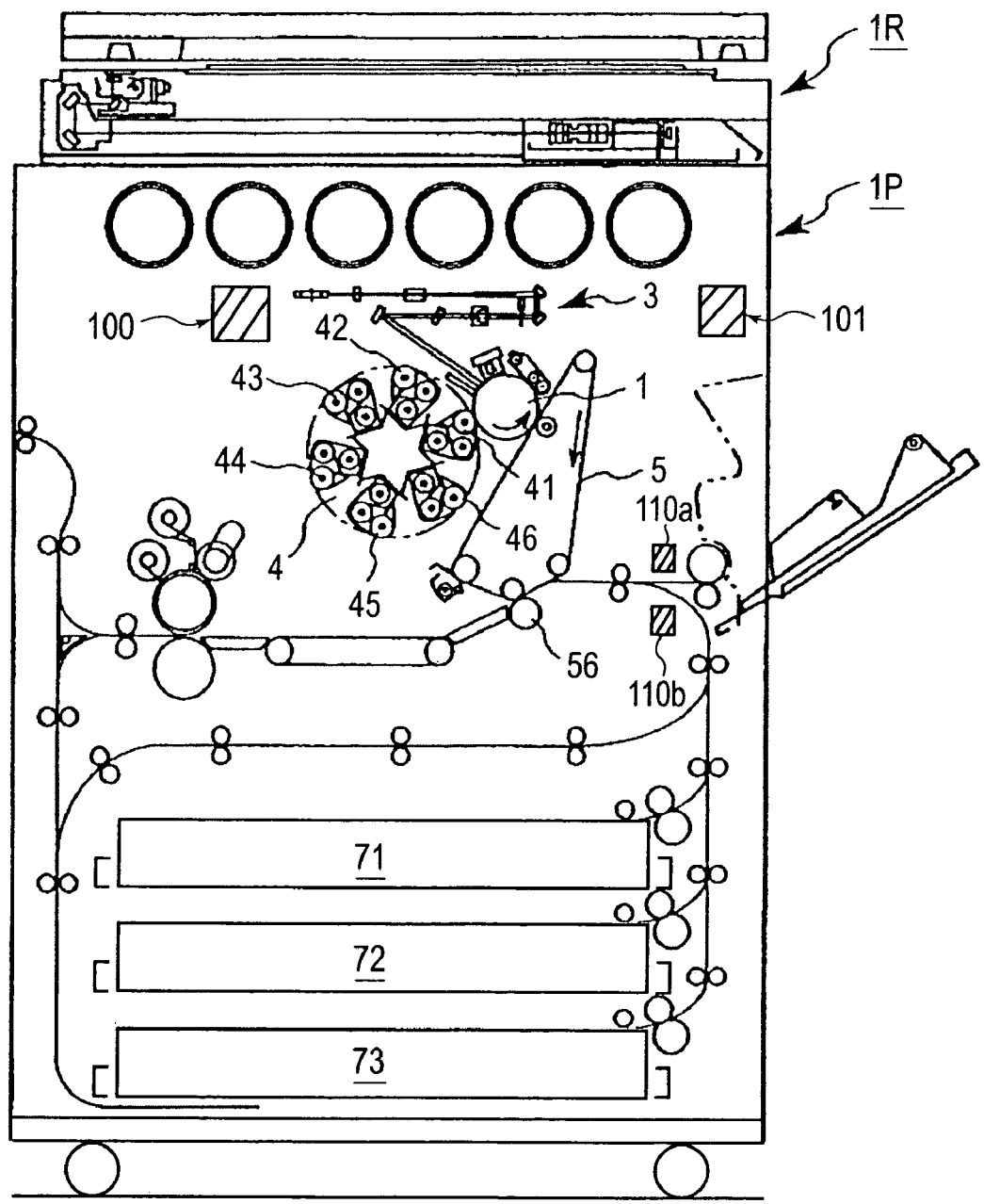
FIG. 17 is a schematic sectional view of an image forming apparatus which uses six toners different in hue or color density, but it employs only a single photosensitive drum to accomplish the same effects as those accomplished by the image forming apparatuses in the preceding embodiments, showing the general structure thereof.
Figure 18:
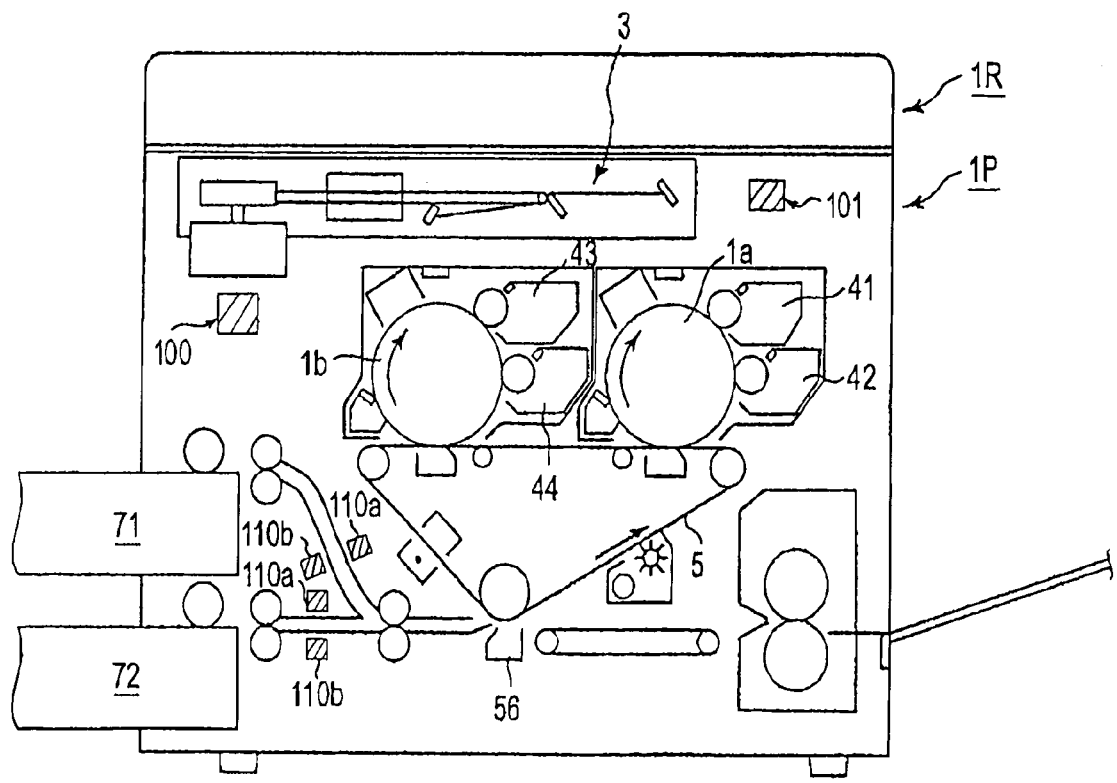
FIG. 18 is a schematic sectional view of an image forming apparatus which uses six toners different in hue or color density, but it employs two photosensitive drums to accomplish the same effects as those accomplished by the image forming apparatuses in the preceding embodiments, showing the general structure thereof.

Although, in the above-described embodiments 1, 2, and 3 of the present invention, the image forming apparatuses were structured as shown in FIG. 1 or 16, the present invention is also applicable to the image forming apparatuses structured as shown in FIGS. 17 and 18, and the effects attainable by such applications are the same as those attained in the image forming apparatuses in the embodiments 1, 2, and 3

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 204662 filed Jul. 31, 2003, which is hereby incorporated by reference.

What is claimed is:

1. An image forming apparatus comprising:
an image bearing member;
electrostatic image forming means for forming an electrostatic image on said image bearing member on the basis of an input signal;
developing means for developing the electrostatic image with toners having the same hue and having different densities;
toner image formation means for forming a toner image on a recording material; and
fixing means for fixing the toner image on the recording material,
wherein a total of the amount per unit area of the toners which have the same hue and different densities and which constitute the toner image, is different when the toner image is formed on the basis of an input signal on the recording material which is a paper sheet and when the toner image is formed on the basis of the same input signal on the recording material which is an OHP sheet.

2. An apparatus according to claim 1, wherein the total amount when the recording material is the OHP sheet is smaller than the total amount when the recording material is the paper sheet.

3. An apparatus according to claim 2, wherein said apparatus is operable with two toners having the same hue and different densities, and the total of the amount per unit area of the toner which has the same hue and light density when the recording material is the OHP sheet is smaller than the total of amount per unit area of the toner which has the same hue and light density when the recording material is the paper sheet.

4. An apparatus according to claim 1, wherein said apparatus is operable in a plurality of modes including:
a first mode in which on the toner which has the highest density is used among the toners having the same hue and different densities; and
a second mode in which the toners having the same hue and different densities are used; and
the apparatus further comprises:
selecting means for selecting between the first mode and the second mode,
wherein said selecting means selects either one of the first and second modes on the basis of whether the recording material is the paper sheet or the OHP sheet.

5. An apparatus according to claim 4, wherein said selecting means selects the first mode when the recording material is the OHP sheet, and selects the second mode when the recording material is the paper sheet.

6. An apparatus according to claim 5, wherein in a toner image formed in the second mode, a total of the amount per unit area of the toners which have the same hue and different densities and which constitute a part of the toner image, is substantially the same as a total of the amount per unit area of the toners which have the same hue and different densities and which constitute another part of the toner image having a different density.

7. An apparatus according to claim 6, wherein the toners having the same hue and different densities are controlled by individual look-up tables when the toner image is formed in the second mode.

8. An apparatus according to claim 5, wherein in a portion of the toner image formed in the second mode formation and having a density higher than a predetermined level, a total of the amount of the toners having the same hue and different densities is substantially constant.

9. An apparatus according to claim 8, wherein the toners having the same hue and different densities are controlled by individual look-up tables when the toner image is formed in the second mode.

10. An image forming apparatus comprising:
an image bearing member;
electrostatic image forming means for forming an electrostatic image on said image bearing member on the basis of an input signal;
developing means for developing the electrostatic image with toners having the same hue and having different densities;
toner image formation means for forming a toner image on a recording material; and
fixing means for fixing the toner image on the recording material,
wherein a total of the amount per unit area of the toners which have the same hue and different densities and which constitute the toner image, is different when the recording material is a transparency type sheet and when the recording material is a reflective type sheet.

11. An apparatus according to claim 10, wherein the total amount when the recording material is the transparency type sheet is smaller than the total amount when the recording material is the reflective type sheet.

12. An apparatus according to claim 11, wherein said apparatus is operable with two toners having the same hue and different densities, and the total of the amount per unit area of the toner which has the same hue and light density when the recording material is a transparency type sheet is smaller than the total of amount per unit area of the toner which has the same hue and light density when the recording material is a reflective type sheet.

13. An apparatus according to claim 10, wherein said image forming apparatus is operable in a plurality of modes including:
a first mode in which on the toner which has the highest density is used among the toners having the same hue and different densities; and
a second mode in which the toners having the same hue and different densities are used, and
wherein the apparatus further comprises:
selecting means for selecting between the first mode and the second mode,
wherein said selecting means selects either one of the first and second modes on the basis of whether the recording material is the transparency type or reflective type.

14. An apparatus according to claim 13, wherein said selecting means selects the first mode when the recording material is a transparency type, and selects the second mode when the recording material is a reflective type.

15. An apparatus according to claim 14, wherein in a toner image formed in the second mode, a total of the amount per unit area of the toners which have the same hue and different densities and which constitute a part of the toner image is substantially the same as a total of the amount per unit area of the toners which have the same hue and different densities and which constitute another part of the toner image having a different density.

16. An apparatus according to claim 15, wherein the toners having the same hue and different densities are controlled by individual look-up tables when the toner image is formed in the second mode.

17. An apparatus according to claim 14, wherein in a portion of the toner image formed in the second mode formation and having a density higher than a predetermined level, a total amount of the toners having the same hue and different densities is substantially constant.

18. An apparatus according to claim 17, wherein the toners having the same hue and different densities are controlled by individual look-up tables when the toner image is formed in the second mode.

* * * * *

UNITED STATES PATENT AND TRADEMARK OFFICE
CERTIFICATE OF CORRECTION

PATENT NO. : 7,120,368 B2  Page 1 of 1
APPLICATION NO. : 10/902057
DATED : October 10, 2006
INVENTOR(S) : Yuichiro Toyohara It is certified that error appears in the above-identified patent and that said Letters Patent is hereby corrected as shown below:

COLUMN 4:
Line 41, "5a," should read --5a--.

COLUMN 5:
Line 38, "to be become" should read --to become--.

COLUMN 12:
Line 47, "6f. The" should read --6f). The--.
Line 61, "apparatus" should read --apparatuses--.

COLUMN 13:
Line 5, "41-46" should read --41, 42, 43, 44, 45 and 46--.
Line 24, "1c, 1d, 1c," should read --1c, 1d, 1e,--.

COLUMN 15:
Line 11, "and 3". should read --and 3.--
Line 54, "which on" should read --which--.

COLUMN 16:
Line 56, "which on" should read --which--.

COLUMN 17:
Line 14, "densities arc" should read --densities are--.

Signed and Sealed this

Twenty-fourth Day of April, 2007

JON W. DUDAS
*Director of the United States Patent and Trademark Office*